United States Patent [19]

Rau et al.

[11] Patent Number: 4,877,938
[45] Date of Patent: Oct. 31, 1989

[54] PLASMA ACTIVATED DEPOSITION OF AN INSULATING MATERIAL ON THE INTERIOR OF A TUBE

[75] Inventors: Hans Rau, Aachen, Fed. Rep. of Germany; Petrus F. De Jongh, Veldhoven, Netherlands

[73] Assignee: U.S. Philips Corporation, New York, N.Y.

[21] Appl. No.: 100,391

[22] Filed: Sep. 24, 1987

[30] Foreign Application Priority Data

Sep. 26, 1986 [DE] Fed. Rep. of Germany ....... 3632684

[51] Int. Cl.[4] .................................................. B23K 9/00
[52] U.S. Cl. ........................ 219/121.59; 219/10.55 F; 219/10.55 M; 219/121.47; 427/12; 427/34; 118/623
[58] Field of Search ................. 219/10.55 F, 10.55 A, 219/10.47, 121 PD, 121 PF, 121 PG, 10.55 R, 10.55 M; 156/643, 646; 204/192; 427/34, 12; 118/621, 623

[56] References Cited

U.S. PATENT DOCUMENTS

| | | | |
|---|---|---|---|
| 3,461,261 | 8/1969 | Lewis et al. | 219/10.55 A |
| 3,560,694 | 2/1971 | White | 219/10.55·A |
| 3,597,567 | 8/1971 | Johnson | 219/10.55 R |
| 4,101,411 | 7/1978 | Suzuki et al. | 219/121 PG |
| 4,292,063 | 9/1981 | Abe | 427/163 |
| 4,423,303 | 12/1983 | Hirose et al. | 219/121 PG |
| 4,543,465 | 9/1985 | Sakudo et al. | 219/121 PG |

FOREIGN PATENT DOCUMENTS

| | | |
|---|---|---|
| 0173659 | 3/1986 | European Pat. Off. . |
| 0216739 | 4/1987 | European Pat. Off. . |
| 2575151 | 6/1986 | France . |
| 2149779 | 6/1983 | United Kingdom . |

Primary Examiner—M. H. Paschall
Attorney, Agent, or Firm—Robert J. Kraus

[57] ABSTRACT

In the internal coating of a tube of an electrically insulating material by a second electrically insulating material by reactive deposition of the second electrically insulating material from a gas mixture which is passed through the tube, the desposition is activated by a plasma which is produced by microwaves and is reciprocated in the tube. A method with low energy consumption and a device of a simple construction are made possible in that the plasma is excited by TE 011 resonance in a cylindrical resonator.

4 Claims, 1 Drawing Sheet

PLASMA ACTIVATED DEPOSITION OF AN INSULATING MATERIAL ON THE INTERIOR OF A TUBE

BACKGROUND OF THE INVENTION

The invention relates to a method for coating the inside of a tube of an electrically insulating material by a second electrically insulating material by reactive deposition of the second electrically insulating material from a gas mixture which is passed through the tube, the deposition being activated by a plasma which is reciprocated in the tube and is produced by microwaves.

The invention furthermore relates to a device for internally coating a tube of an electrically insulating material by a second electrically insulating material by reactive deposition of the second electrically insulating material from a gas mixture which is passed through the tube, the device comprising a gas supply system for supplying the gas mixture to the tube, a microwave generator and a cylindrical microwave resonator for producing and maintaining a plasma in the gas mixture in the tube, means to reciprocate the plasma in the longitudinal direction of the tube and means for heating the tube.

A method and device of this type are known inter alia from Appl. Phys. Lett. 28 (1976) 645–646 and Topics in Current Chemistry 89 (1980) 107–131. These literature references describe the manufacture of optical fibres according to the PCVD method. In this method, light-conducting material is deposited as the second electrically insulating material by means of the plasma on the inside of the tube from the gas mixture which comprises volatile starting materials. The tube consists either of synthetically produced amorphous silica or of amorphous silica manufactured from quartz crystals by melting (fused silica, quartz glass), which may optionally be doped. The tube may optionally consist both of synthetically manufactured and of amorphous silica (fused silica, quartz glass) manufactured from quartz crystals by melting and which silica may optionally be doped. After a quantity of light-conducting material corresponding to the optical fibre construction to be obtained has been deposited, the tube is made to collapse to form a solid preform from which optical fibres are drawn.

As is described in greater detail in the above literature references, temperatures of the wall of the tube between 1100° and 1300° C. are required for the deposition of adhering layers of light-conducting material. In order to ensure these temperatures during the coating step, furnaces are used as additional energy sources. Furnaces which are moved over the tube to be coated synchronously with the microwave resonator, or a stationary furnace in which the microwave resonator can be moved over the tube to be coated inside the furnace can be used for this purpose.

In both cases the microwave resonator in which the plasma is produced is reciprocated along a fused silica tube. Due to the comparatively low temperature, the deposition of the doped fused silica layers take place only in the range of the plasma, any thermally activated reaction if occurring at all, is of little practical importance. The two modes of operation differ as to how the required deposition temperature of preferably approximately 1200° to 1260° C. is maintained. In one case two furnaces which are flange-mounted to the resonator move over the tube together with said resonator. Of course the tubes should have such a length that the tube furnace, even in the extreme positions, do not inadmissibly heat the means for clamping the tube because these means are vacuum-tight and have to remain vacuum-tight. Therefore the fused silica tube should be at least three times as long as the actual deposition zone. This requires much space and causes extra costs.

In the second embodiment a stationary furnace is used in which an optionally cooled resonator moves. Although in this case the deposition length is only negligibly shorter than the tube length, the stationary furnace must have a considerable inner volume and consequently is bulky and expensive. Its electric connection power is, for example, more than 20 kW. The length of the resonator corresponds approximately to half a vacuum wavelength. In this microwave resonator a slightly modified coaxial mode is used in which the electrical field lines extend radially.

It has been found that in this resonator microwave energy leaks away through the axial bores. This is disadvantageous because screening measures have to be taken to keep below admissible limits the microwave energy which can be detected outside the device.

A further disadvantage of this resonator is caused by its dimensions. Although the TEM basic mode should be excited, higher modes are already possible with the given dimensions, for example (the TE11-Coaxial Conductor Mode) which upon excitation produce a deviation from the rotational symmetry of the field distribution. When such modes are to be avoided, because for example an asymmetric deposition, should be avoided, a fixed diameter D ($=D_i+D_a/2$; $D_i$ and $D_a$ meaning inner and outer diameter respectively) of the resonator should satisfy the following condition:

$$D \leq \lambda/\pi$$

wherein $\lambda$ (=vacuum wavelength)=12.24 cm at 2.45 GHz, and $\lambda/\pi=3.9$. At, $D_i=7.1$ cm and $D_a=3.1$ cm, D is already 5.1 cm. An increase in the diameter of the resonator, for example for larger tube diameters, is therefore risky. Moreover the stationary furnace then should also be still larger than it is already now.

SUMMARY OF THE INVENTION

It is an object of the invention to provide a method with low energy consumption and a device of simple construction for coating the inside of a tube.

According to the invention this object is achieved with a method of the type mentioned in the opening paragraph in which the plasma is excited by TE-011 resonance in a cylindrical resonator.

According to the invention this object is furthermore achieved with a device of the type mentioned in the opening paragraph in which the ratio of the diameter to the height of the microwave resonator is determined by the TE 011 resonance in the microwave resonator.

The choice of the ratio of diameter to height of the microwave resonator to produce a resonance of a given mode and a given wave type, so in the case of the invention the TE 011 resonance, is made according to the formulae and diagrams given in H. Meinke, F. W. Gundlach "Taschenbuch der Hochfrequenztechnik" 2nd edition (Berlin/Göttingen/Heidelberg 1962) pp. 461–464 and H. Püschner "Wärme durch Mikrowellen" (Eindhoven, 1964) pp. 198–201. This will be described in greater detail hereinafter with reference to an example.

A resonator of the TE 011 mode oscillates in a mode in which the electric field lines are arranged concentrically. So it does not excite coaxial modes. The axial bores in the present resonator which in itself is much larger than the previously mentioned coaxial resonator can hence be made essentially large without leaking away of the microwaves occurring. For example, with a bore diameter of 5 cm substantially no microwave energy could be detected at the end of the bores when a plasma was generated by the resonator with 500 W power.

Such a resonator now presents the possibility to move the stationary furnace through the bores of the resonator and to reciprocate the resonator outside the furnace.

In one embodiment the furnace is only a thermally insulated tube in which the fused silica tube to be coated is present. The absorbed microwave energy must then be sufficient to heat the fused silica tube at approximately 1200° to 1260° C. (during a continuous fast reciprocating movement). For that purpose, as experiments have demonstrated, approximately 1,2 kW absorbed microwave energy is required in a furnace in the form of a fused silica tube of 2.6 cm inside diameter and an overall length of 80 cm with a commercially available insulation applied thereto up to about 5.0 cm total diameter.

A further possibility is a partial heating of this furnace, for example, by means of an electric heating coil, in this embodiment the rest of the required thermal energy is provided by absorption of microwave energy.

The ignition of the plasma in the TE 011 resonator is much easier than in the coaxial type, it usually ignites automatically when electric power is applied to the resonator. The Q of the resonator is essentially higher than in the coaxial type and hence an adjustment of the resonant frequency is necessary when parameters vary (for example, temperature of the fused silica tube, pressure in the plasma, etc.). This adjustment preferably occurs automatically by means of an electronic control which moves one of the two end plates of the resonator in or out. As already mentioned, the resonance frequency depends on the overall length of the inner resonance space. For that purpose, a toothed disk is flange-mounted to one of the end plates and is driven via an electronically controlled motor. In this manner it is possible to perform the operation of the resonator with a desired reflected power near the reflection minimum in a stable manner.

BRIEF DESCRIPTION OF THE DRAWING

The invention permits of using a stationary furnace in which the deposition length is about the tube length.

An embodiment of the invention is shown in the drawing and will be explained in greater detail hereinafter. In the drawing.

DESCRIPTION OF THE PREFERRED EMBODIMENT

Figure 1:
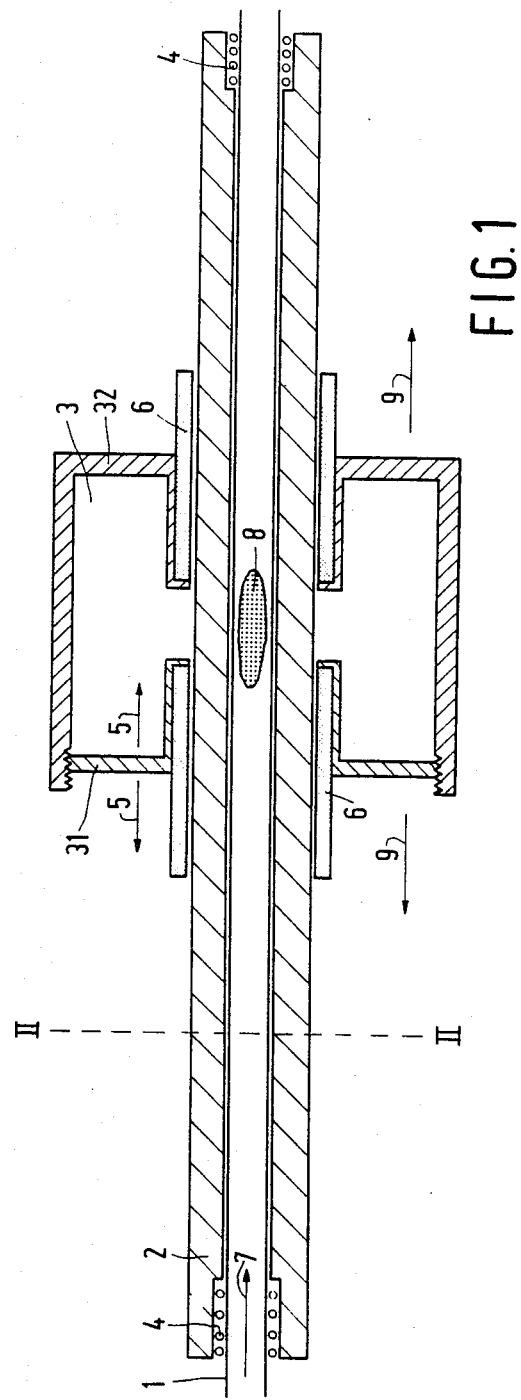
FIG. 1 is a diagrammatic sectional view of a resonator which can be moved over a heat insulating tube.

In FIG. 1 a fused silica tube 1 is to be coated outside is surrounded by a heat insulation tube 2 over which a TE 011 resonator 3 can be reciprocated. At the ends of the insulation tube 2 additional heating elements 4 may be provided so as to compensate for the drop in temperature at the reversal points of the resonator movement and to ensure an optimum temperature distribution along the fused silica tube 1 to be coated.

The TE 011 resonator has a movable wall surface 31 which can be moved for tuning the resonant frequency to the operating frequency. This is done, for example, by means of an electric motor not shown which moves the wall surface 31 into or out of a stationary part 32 of the resonator. The motor is controlled so that control is done at a given reflected microwave energy. Said inward or outward movement is indicated by arrow 5.

Graphite tube 6 secured to the metal parts 31 and 32 must absorb the microwave energy leaking from the resonance if any and hence reduce below admissible limits in that case the energy density of the microwave field which can be detected outside the arrangement.

Figure 2:
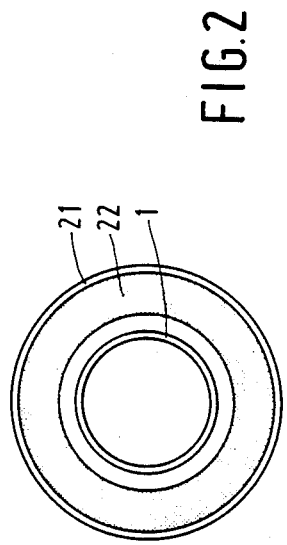
FIG. 2 is a diagrammatic sectional view II—II of the heat insulation tube a right angles to its axis.

FIG. 2 is a sectional view of a suitable embodiment of the heat insulation tube 2. It has been found necessary that said tube on its outside should be straight and of constant dimensions so as not to impede the movement of the resonator. For this purpose it is preferably a two-part-construction. Insulation material 22 is introduced into a fused silica tube 21 of, for example, 4.9 cm outside diameter. The insulation material is provided with a bore on its inside so that the glass tube 1 to be coated fits in it. The heat insulation tube 2 should not substantially absorb microwave energy. This is ensured by using commercially available materials, such as, Fiberfrax (Carborundum Werke GmbH).

During operation of the FIG. 1 device a reactive gas mixture consisting for example of $SiCl_4$, oxygen and a chloride of a dope material is introduced into the fused silica tube 1, which is indicated by an arrow 7. A plasma 8 is produced by the microwaves in the resonator 3. The reciprocating movement of the resonator is indicated by the arrows 9. The microwave energy which is absorbed by the plasma and which results from the difference between irradiated and reflected microwave energy is adjusted so that the temperature required for a perfect inside coating of the fused silica tube 1 by deposition of glass from the gas mixture is ensured.

What is claimed is:

1. A method for coating the inside of a longitudinally extending tube of a first electrically insulating material with a second electrically insulating material, the tube having open ends thereof attached to a system for passing through said tube a gaseous source of the second electrically insulating material, said method comprising the steps of:
   a. disposing the tube in a furnace comprising a thermally insulating tubular body surrounding at least a substantial length of said tube;
   b. disposing around a portion of the length of the tubular body surrounding a portion of the length of the tube to be coated a cylindrical microwave resonator configured to produce $TE_{011}$ microwave energy in the tube; and
   c. reciprocating the resonator along the length of the tubular body while producing said microwave energy, said energy both heating the tube and producing from the gaseous source a plasma to effect reactive deposition of the second electrically insulating material onto the inside of said tube.

2. An apparatus for coating the inside of a longitudinally extending tube of a first electrically insulating material with a second electrically insulating material, said apparatus comprising:

a. a gas supply system adapted for attachment to open ends of the tube for passing through said tube a gaseous source of the second electrically insulating material;
b. a furnace comprising a thermally insulating tubular body for surrounding at least a substantial length of said tube;
c. a cylindrical microwave resonator configured for disposition around a portion of the length of the tubular body surrounding a portion of the length of the tube to be coated and configured to produce $TE_{011}$ microwave energy in the tube; and
d. means for reciprocating the resonator along the length of the tubular body while producing said microwave energy, said energy both heating the tube and producing from the gaseous source a plasma to effect reactive deposition of the second electrically insulating material onto the inside of said tube.

3. An apparatus as in claim 2 where the furnace includes heating elements disposed at opposite ends of the tubular body.

4. An apparatus as in claim 2 where the tubular body is dimensioned to surround substantially the entire length of the tube.

* * * * *